US012657427B2

(12) United States Patent
Wu et al.

(10) Patent No.: US 12,657,427 B2
(45) Date of Patent: Jun. 16, 2026

(54) SYSTEMS, METHODS, AND COMPUTER PROGRAM PRODUCTS FOR DETERMINING UNCERTAINTY FROM A DEEP LEARNING CLASSIFICATION MODEL

(71) Applicant: Visa International Service Association, San Francisco, CA (US)

(72) Inventors: Peng Wu, College Station, TX (US); Dan Wang, Austin, TX (US); Yiwei Cai, Mercer Island, WA (US)

(73) Assignee: Visa International Service Association, San Francisco, CA (US)

( * ) Notice: Subject to any disclaimer, the term of this patent is extended or adjusted under 35 U.S.C. 154(b) by 1031 days.

(21) Appl. No.: 17/727,861

(22) Filed: Apr. 25, 2022

(65) Prior Publication Data

US 2022/0366214 A1     Nov. 17, 2022

Related U.S. Application Data

(60) Provisional application No. 63/183,113, filed on May 3, 2021.

(51) Int. Cl.
G06N 3/04 (2023.01)
G06F 18/2415 (2023.01)
(Continued)

(52) U.S. Cl.
CPC ........... G06N 3/04 (2013.01); G06F 18/2415 (2023.01)

(58) Field of Classification Search
CPC ...... G06N 3/04; G06N 3/0464; G06N 3/0475; G06N 3/0495; G06N 3/0499; G06N 3/045;
(Continued)

(56) References Cited

U.S. PATENT DOCUMENTS

2015/0088783 A1*  3/2015  Mun ..................... G06Q 40/02
                                                      705/36 R
2018/0218261 A1   8/2018  Myara et al.
(Continued)

OTHER PUBLICATIONS

Yildirium et al., Leveraging Uncertainty in Deep Learning for Selective Classification, May 23, 2019, In Proceedings of ACM Conference (Conference'17). ACM, New York, NY, USA, 10 pages, https://arxiv.org/abs/1905.09509 (Year: 2019).*

(Continued)

*Primary Examiner* — Kakali Chaki
*Assistant Examiner* — Molly C Sippel
(74) *Attorney, Agent, or Firm* — The Webb Law Firm

(57) ABSTRACT

Disclosed are systems for determining uncertainty from a deep learning classification model. A system for determining uncertainty from a deep learning classification model may include at least one processor programmed or configured to determine a classification for an input based on a deep learning classification model, generate an uncertainty score for the classification, determine whether the uncertainty score satisfies a threshold, in response to determining that the uncertainty score satisfies the threshold, determine an automated action based on a decision model, and in response to determining that the uncertainty score does not satisfy the threshold, determine the automated action based on at least one predefined rule. Methods and computer program products are also disclosed.

18 Claims, 6 Drawing Sheets

(51) Int. Cl.

| | |
|---|---|
| *G06N 3/042* | (2023.01) |
| *G06N 3/045* | (2023.01) |
| *G06N 3/0475* | (2023.01) |
| *G06N 3/08* | (2023.01) |
| *G06N 3/0895* | (2023.01) |
| *G06N 3/09* | (2023.01) |
| *G06N 3/094* | (2023.01) |

(58) Field of Classification Search

CPC ...... G06N 3/0455; G06N 3/047; G06N 3/042;
G06N 3/08; G06N 3/0895; G06N 3/09;
G06N 3/091; G06N 3/092; G06N 3/094;
G06N 3/096; G06N 3/098; G06N 3/0985;
G06F 18/241

See application file for complete search history.

(56) References Cited

U.S. PATENT DOCUMENTS

| | | | |
|---|---|---|---|
| 2019/0066105 A1* | 2/2019 | Banks Larsen ...... | G06Q 20/229 |
| 2020/0051087 A1* | 2/2020 | Adjaoute ........... | G06Q 20/4016 |
| 2020/0326667 A1* | 10/2020 | Ahuja ................... | G06N 3/047 |
| 2021/0374756 A1 | 12/2021 | Pandey et al. | |

OTHER PUBLICATIONS

Sicotte, Calculating Confidence Intervals for a Logistic Regression Stack Exchange Answer 41, Sep. 5, 2018, https://web.archive.org/web/20210409024704/https://stats.stackexchange.com/questions/354098/calculating-confidence-intervals-for-a-logistic-regression (Year: 2018).*

De Vries et al., "Learning Confidence for Out-of-Distribution Detection in Neural Networks", arXiv:1802.04865v1, Feb. 13, 2018, 12 pages.

Guo et al., "On Calibration of Modern Neural Networks", arXiv:1706.04599v2, Aug. 3, 2017, 14 pages.

Li et al., "Triple Generative Adversarial Nets", 31st Conference on Neural Information Processing Systems, 2017, pp. 1-15.

Wu et al., "Quantifying Intrinsic Uncertainty in Classification via Deep Dirichlet Mixture Networks", arXiv:1906.04450v2, Aug. 14, 2019, 9 pages.

* cited by examiner $$z_i = \frac{1}{L}\sum_j (\mu_i + \sigma_i \epsilon_{ij})$$

$$L = L_1 + L_2$$

where $L_1$ is the regular cross-entropy $$-\left(\sum_i y_i \log p_i + (1 - y_i)\log(1 - p_i)\right)$$

and $L_2$ is $$-\left(\sum_i \lambda_1 \log \sigma_i + \lambda_2(3 - \sigma_i)I(\sigma_i > 3)\right)$$

SYSTEMS, METHODS, AND COMPUTER PROGRAM PRODUCTS FOR DETERMINING UNCERTAINTY FROM A DEEP LEARNING CLASSIFICATION MODEL

CROSS REFERENCE TO RELATED APPLICATION

This application claims the benefit of U.S. Provisional Patent Application No. 63/183,113, filed on May 3, 2021, the disclosure of which is hereby incorporated by reference in its entirety.

BACKGROUND

1. Technical Field

The present disclosure relates generally to deep learning models and, in some non-limiting aspects or embodiments, to systems, methods, and computer program products for determining uncertainty from a deep learning classification model.

2. Technical Considerations

With the increased use of deep learning classification, it is desirable to understand and quantify the uncertainty of a model output. Existing methods of determining a predicted probability of a model outcome do not result in a true confidence score and cannot process data that is difficult to predict. Using a sample-based approach for training data is computationally inefficient and infeasible for a production environment with large amounts of data. Moreover, existing systems will generally dismiss or ignore non-confident predictions that do not satisfy a predetermined threshold, making the usefulness of the data depend on a potentially imprecise threshold that is set.

SUMMARY

According to non-limiting embodiments or aspects, provided is a system comprising: at least one processor programmed or configured to: determine a classification for an input based on a deep learning classification model; generate an uncertainty score for the classification; determine whether the uncertainty score satisfies a threshold; and in response to determining that the uncertainty score satisfies the threshold, determine an automated action based on a decision model.

In non-limiting embodiments or aspects, the at least one processor is further programmed or configured to: in response to determining that the uncertainty score does not satisfy the threshold, determine the automated action based on at least one predefined rule. In non-limiting embodiments or aspects, the at least one processor is programmed or configured to generate the uncertainty score for the classification based on the deep learning probability model. In non-limiting embodiments or aspects, the at least one processor is programmed or configured to: determine two parameters of a Beta distribution of predicted probabilities based on the deep learning probability model, wherein generating the uncertainty score for the classification is based on the two parameters. In non-limiting embodiments or aspects, the at least one processor is programmed or configured to: determine two parameters of a logit layer of the deep learning probability model, wherein generating the uncertainty score for the classification is based on the two parameters. In non-limiting embodiments or aspects, the input comprises transaction data for a requested transaction, and the automated action comprises at least one of the following: verifying an account associated with the requested transaction, accepting a stand-in processing request and processing the transaction, or rejecting the stand-in processing request.

According to non-limiting embodiments or aspects, provided is a method comprising: determining a classification for an input based on a deep learning classification model; generating an uncertainty score for the classification; determining whether the uncertainty score satisfies a threshold; and in response to determining that the uncertainty score satisfies the threshold, determine an automated action based on a decision model. In non-limiting embodiments or aspects, the method further comprises: in response to determining that the uncertainty score does not satisfy the threshold, determining the automated action based on at least one predefined rule. In non-limiting embodiments or aspects, the method further comprises: generating the uncertainty score for the classification based on the deep learning probability model. In non-limiting embodiments or aspects, the method further comprises: determining two parameters of a Beta distribution of predicted probabilities based on the deep learning probability model, wherein generating the uncertainty score for the classification is based on the two parameters. In non-limiting embodiments or aspects, the method further comprises: determining two parameters of a logit layer of the deep learning probability model, wherein generating the uncertainty score for the classification is based on the two parameters. In non-limiting embodiments or aspects, the input comprises transaction data for a requested transaction, and the automated action comprises at least one of the following: verifying an account associated with the requested transaction, accepting a stand-in processing request and processing the transaction, or rejecting the stand-in processing request.

According to non-limiting embodiments or aspects, provided is a computer program product comprising at least one non-transitory computer-readable medium including program instructions that, when executed by at least one processor, cause the at least one processor to: determine a classification for an input based on a deep learning classification model; generate an uncertainty score for the classification; determine whether the uncertainty score satisfies a threshold; and in response to determining that the uncertainty score satisfies the threshold, determine an automated action based on a decision model.

In non-limiting embodiments or aspects, the program instructions further cause the at least one processor to: in response to determining that the uncertainty score does not satisfy the threshold, determine the automated action based on at least one predefined rule. In non-limiting embodiments or aspects, the program instructions further cause the at least one processor to: generate the uncertainty score for the classification based on the deep learning probability model. In non-limiting embodiments or aspects, the program instructions further cause the at least one processor to: determine two parameters of a Beta distribution of predicted probabilities based on the deep learning probability model, wherein generating the uncertainty score for the classification is based on the two parameters. In non-limiting embodiments or aspects, the program instructions further cause the at least one processor to: determine two parameters of a logit layer of the deep learning probability model, wherein generating the uncertainty score for the classification is based on the two parameters. In non-limiting embodiments or aspects, the input comprises transaction data for a requested transaction, and the automated action comprises at least one of the following: verifying an account associated with the requested transaction, accepting a stand-in processing request and processing the transaction, or rejecting the stand-in processing request.

According to non-limiting embodiments or aspects, provided is a system comprising: at least one processor programmed or configured to: determine a classification for an input based on a deep learning classification model; determine two parameters corresponding to at least two neurons of one layer of the deep learning classification model; generate an uncertainty score for the classification based at least partially on the two parameters; determine whether the uncertainty score satisfies a threshold; and in response to determining that the uncertainty score satisfies the threshold, determine an automated action based on a decision model.

In non-limiting embodiments or aspects, the at least one processor is further programmed or configured to: in response to determining that the uncertainty score does not satisfy the threshold, determine the automated action based on at least one predefined rule. In non-limiting embodiments or aspects, the at least one processor is further programmed or configured to: determine values for the two parameters based on a Beta distribution of predicted probabilities of the deep learning classification model. In non-limiting embodiments or aspects, the layer comprises a logit layer, and the at least one processor is further programmed or configured to: determine values for the two parameters of the logit layer of the deep learning classification model.

According to non-limiting embodiments or aspects, provided is a method comprising: determining a classification for an input based on a deep learning classification model; determining two parameters corresponding to at least two neurons of one layer of the deep learning classification model; generating an uncertainty score for the classification based at least partially on the two parameters; determining whether the uncertainty score satisfies a threshold; and in response to determining that the uncertainty score satisfies the threshold, determining an automated action based on a decision model.

In non-limiting embodiments or aspects, the method further comprises: in response to determining that the uncertainty score does not satisfy the threshold, determine the automated action based on at least one predefined rule. In non-limiting embodiments or aspects, the method further comprises: determining values for the two parameters based on a Beta distribution of predicted probabilities of the deep learning classification model. In non-limiting embodiments or aspects, the layer comprises a logit layer, the method further comprises: determining values for the two parameters of the logit layer of the deep learning classification model.

According to non-limiting embodiments or aspects, provided is a computer program product comprising at least one non-transitory computer-readable medium including program instructions that, when executed by at least one processor, cause the at least one processor to: determine a classification for an input based on a deep learning classification model; determine two parameters corresponding to at least two neurons of one layer of the deep learning classification model; generate an uncertainty score for the classification based at least partially on the two parameters; determine whether the uncertainty score satisfies a threshold; and in response to determining that the uncertainty score satisfies the threshold, determine an automated action based on a decision model.

In non-limiting embodiments or aspects, the program instructions further cause the at least one processor to: in response to determining that the uncertainty score does not satisfy the threshold, determine the automated action based on at least one predefined rule. In non-limiting embodiments or aspects, the program instructions further cause the at least one processor to: determine values for the two parameters based on a Beta distribution of predicted probabilities of the deep learning classification model. In non-limiting embodiments or aspects, the layer comprises a logit layer, and the program instructions further cause the at least one processor to: determine values for the two parameters of the logit layer of the deep learning classification model.

Further embodiments or aspects are set forth in the following numbered clauses:

Clause 1: A system comprising: at least one processor programmed or configured to: determine a classification for an input based on a deep learning classification model; generate an uncertainty score for the classification; determine whether the uncertainty score satisfies a threshold; and in response to determining that the uncertainty score satisfies the threshold, determine an automated action based on a decision model.

Clause 2: The system of clause 1, wherein the at least one processor is further programmed or configured to: in response to determining that the uncertainty score does not satisfy the threshold, determine the automated action based on at least one predefined rule.

Clause 3: The system of clauses 1 or 2, wherein the at least one processor is programmed or configured to generate the uncertainty score for the classification based on the deep learning probability model.

Clause 4: The system of any of clauses 1-3, wherein the at least one processor is programmed or configured to: determine two parameters of a Beta distribution of predicted probabilities based on the deep learning probability model, wherein generating the uncertainty score for the classification is based on the two parameters.

Clause 5: The system of any of clauses 1-4, wherein the at least one processor is programmed or configured to: determine two parameters of a logit layer of the deep learning probability model, wherein generating the uncertainty score for the classification is based on the two parameters.

Clause 6: The system of any of clauses 1-5, wherein the input comprises transaction data for a requested transaction, and wherein the automated action comprises at least one of the following: verifying an account associated with the requested transaction, accepting a stand-in processing request and processing the transaction, or rejecting the stand-in processing request.

Clause 7: A method comprising: determining a classification for an input based on a deep learning classification model; generating an uncertainty score for the classification; determining whether the uncertainty score satisfies a threshold; and in response to determining that the uncertainty score satisfies the threshold, determine an automated action based on a decision model.

Clause 8: The method of clause 7, further comprising: in response to determining that the uncertainty score does not satisfy the threshold, determining the automated action based on at least one predefined rule.

Clause 9: The method of clauses 7 or 8, further comprising: generating the uncertainty score for the classification based on the deep learning probability model.

Clause 10: The method of any of clauses 7-9, further comprising: determining two parameters of a Beta distribution of predicted probabilities based on the deep learning probability model, wherein generating the uncertainty score for the classification is based on the two parameters.

Clause 11: The method of any of clauses 7-10, further comprising: determining two parameters of a logit layer of the deep learning probability model, wherein generating the uncertainty score for the classification is based on the two parameters.

Clause 12: The method of any of clauses 7-11, wherein the input comprises transaction data for a requested transaction, and wherein the automated action comprises at least one of the following: verifying an account associated with the requested transaction, accepting a stand-in processing request and processing the transaction, or rejecting the stand-in processing request.

Clause 13: A computer program product comprising at least one non-transitory computer-readable medium including program instructions that, when executed by at least one processor, cause the at least one processor to: determine a classification for an input based on a deep learning classification model; generate an uncertainty score for the classification; determine whether the uncertainty score satisfies a threshold; and in response to determining that the uncertainty score satisfies the threshold, determine an automated action based on a decision model.

Clause 14: The computer program product of clause 13, wherein the program instructions further cause the at least one processor to: in response to determining that the uncertainty score does not satisfy the threshold, determine the automated action based on at least one predefined rule.

Clause 15: The computer program product of clauses 13 or 14, wherein the program instructions further cause the at least one processor to: generate the uncertainty score for the classification based on the deep learning probability model.

Clause 16: The computer program product of any of clauses 13-15, wherein the program instructions further cause the at least one processor to: determine two parameters of a Beta distribution of predicted probabilities based on the deep learning probability model, wherein generating the uncertainty score for the classification is based on the two parameters.

Clause 17: The computer program product of any of clauses 13-16, wherein the program instructions further cause the at least one processor to: determine two parameters of a logit layer of the deep learning probability model, wherein generating the uncertainty score for the classification is based on the two parameters.

Clause 18: The computer program product of any of clauses 13-17, wherein the input comprises transaction data for a requested transaction, and wherein the automated action comprises at least one of the following: verifying an account associated with the requested transaction, accepting a stand-in processing request and processing the transaction, or rejecting the stand-in processing request.

Clause 19: A system comprising: at least one processor programmed or configured to: determine a classification for an input based on a deep learning classification model; determine two parameters corresponding to at least two neurons of one layer of the deep learning classification model; generate an uncertainty score for the classification based at least partially on the two parameters; determine whether the uncertainty score satisfies a threshold; and in response to determining that the uncertainty score satisfies the threshold, determine an automated action based on a decision model.

Clause 20: The system of clause 19, wherein the at least one processor is further programmed or configured to: in response to determining that the uncertainty score does not satisfy the threshold, determine the automated action based on at least one predefined rule.

Clause 21: The system of clauses 19 or 20, wherein the at least one processor is further programmed or configured to: determine values for the two parameters based on a Beta distribution of predicted probabilities of the deep learning classification model.

Clause 22: The system of any of clauses 19-21, wherein the layer comprises a logit layer, and wherein the at least one processor is further programmed or configured to: determine values for the two parameters of the logit layer of the deep learning classification model.

Clause 23: A method comprising: determining a classification for an input based on a deep learning classification model; determining two parameters corresponding to at least two neurons of one layer of the deep learning classification model; generating an uncertainty score for the classification based at least partially on the two parameters; determining whether the uncertainty score satisfies a threshold; and in response to determining that the uncertainty score satisfies the threshold, determining an automated action based on a decision model.

Clause 24: The method of clause 23, further comprising: in response to determining that the uncertainty score does not satisfy the threshold, determine the automated action based on at least one predefined rule.

Clause 25: The method of clauses 23 or 24, further comprising: determining values for the two parameters based on a Beta distribution of predicted probabilities of the deep learning classification model.

Clause 26: The method of any of clauses 23-25, wherein the layer comprises a logit layer, further comprising: determining values for the two parameters of the logit layer of the deep learning classification model.

Clause 27: A computer program product comprising at least one non-transitory computer-readable medium including program instructions that, when executed by at least one processor, cause the at least one processor to: determine a classification for an input based on a deep learning classification model; determine two parameters corresponding to at least two neurons of one layer of the deep learning classification model; generate an uncertainty score for the classification based at least partially on the two parameters; determine whether the uncertainty score satisfies a threshold; and in response to determining that the uncertainty score satisfies the threshold, determine an automated action based on a decision model.

Clause 28: The computer program product of clause 27, wherein the program instructions further cause the at least one processor to: in response to determining that the uncertainty score does not satisfy the threshold, determine the automated action based on at least one predefined rule.

Clause 29: The computer program product of clauses 27 or 28, wherein the program instructions further cause the at least one processor to: determine values for the two parameters based on a Beta distribution of predicted probabilities of the deep learning classification model.

Clause 30: The computer program product of any of clauses 27-29, wherein the layer comprises a logit layer, and wherein the program instructions further cause the at least one processor to: determine values for the two parameters of the logit layer of the deep learning classification model.

These and other features and characteristics of the presently disclosed subject matter, as well as the methods of operation and functions of the related elements of structures and the combination of parts and economies of manufacture, will become more apparent based on the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

Figure 1:
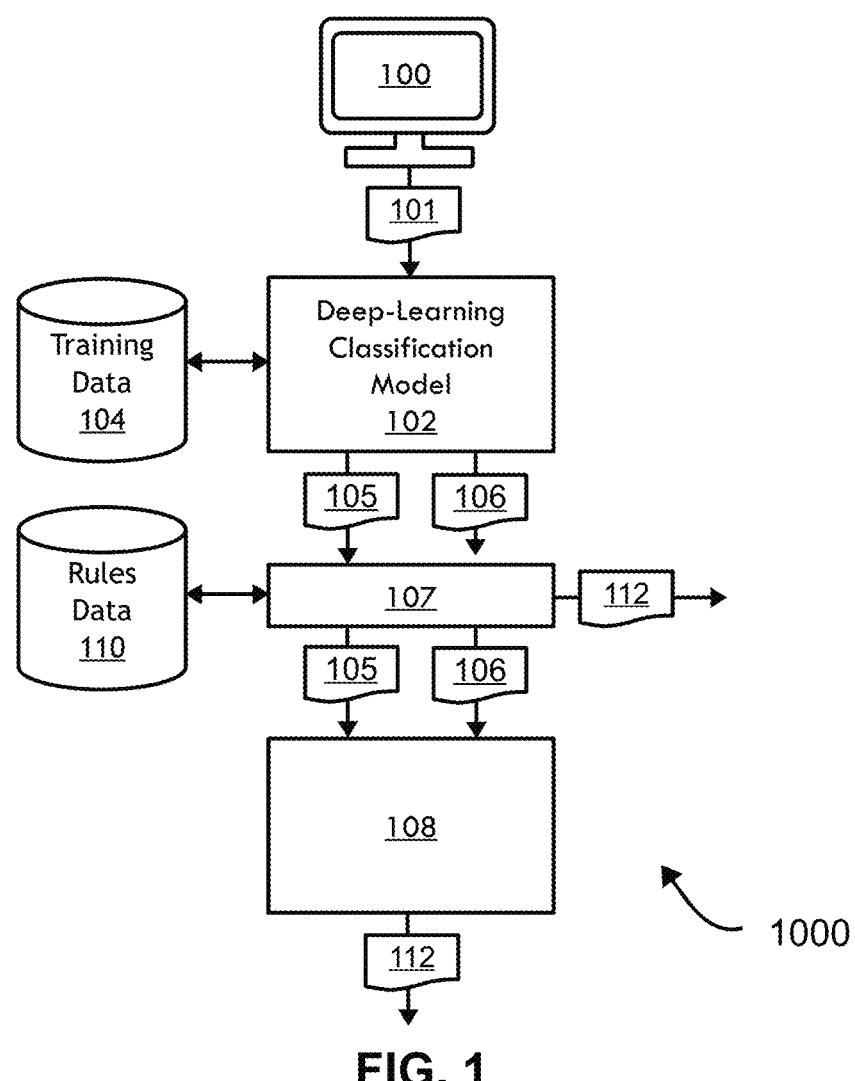
FIG. 1 is a schematic diagram of a system for determining uncertainty from a deep learning classification model according to non-limiting aspects or embodiments.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "issuer," "issuer institution," "issuer bank," or "payment device issuer" may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein "issuer system" may refer to one or more computer systems operated by or on behalf of an issuer, such as a server executing one or more software applications. For example, an issuer system may include one or more authorization servers for authorizing a transaction.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein "merchant system" may refer to one or more computer systems operated by or on behalf of a merchant, such as a server executing one or more software applications. As used herein, the term "product" may refer to one or more goods and/or services offered by a merchant.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein "transaction service provider system" may refer to one or more computer systems operated by or on behalf of a transaction service provider, such as a transaction service provider system executing one or more software applications. A transaction service provider system may include one or more processors and, in some non-limiting embodiments, may be operated by or on behalf of a transaction service provider.

As used herein, the term "uncertainty score" refers to a metric that represents the uncertainty (or certainty) and/or confidence (or lack of confidence) of a classification output of a model. An uncertainty score may be presented in positive or negative terms (e.g., certainty/confidence or lack thereof).

Provided are systems, methods, and computer program products for determining uncertainty from a deep learning classification model. Non-limiting embodiments result in an uncertainty score that may be input into a decision model for efficient and intelligent decision making in numerous applications. Moreover, non-limiting embodiments provide for the optimization of neurons of an artificial neural network (ANN) classification model during training, resulting in faster and more efficient computations compared to existing sampling-based training methods.

Non-limiting embodiments provide a faster and more computational efficient approach to determining and quantifying the uncertainty of a model as compared to existing techniques. Both training and run-time execution of the model are made more efficient through use of non-limiting embodiments described herein. Moreover, non-limiting embodiments provide for a pipeline that can be provided as a service that automates uncertainty determinations upon request from a client user.

Referring now to FIG. 1, illustrated is a diagram of a system 1000 for determining uncertainty from a deep learning classification model 102. As illustrated in FIG. 1, the system 1000 includes a client device 100 (e.g., a computing device) in communication with the deep learning classification model 102. The model 102 may be stored and executed by one or more server computers, as an example, or may be local to the client device 100. In non-limiting embodiments, the model 102 may be executed by a transaction service provider and offered to client computing devices as a service.

The model 102 may be trained based on input training data 104, which includes features and corresponding classifications (e.g., labels) for each data record. The model 102 may be pre-trained and/or may be trained in response to the client device 100 or another computing device inputting the training data 104. Once the model 102 is trained, the client device 100 communicates an input 101 to the model 102. In non-limiting embodiments, the input may include an account profile, an authorization request message, transaction data, and/or the like to be classified (e.g., labeled) by the model 102. The model 102 outputs a classification 105 (e.g., a label) and an uncertainty score 106. The outputs 105, 106 may be used as input to a decision engine 107, which may include a computing device and/or software application configured to output an action 112 to be performed based on the inputs 105, 106. In non-limiting embodiments, the decision engine 107 may be part of and/or executed by the client device 100. In other non-limiting embodiments, the decision engine 107 may be remote from the client device 100 and part of and/or executed by a server computer.

In some examples, with continued reference to FIG. 1, if the uncertainty score satisfies a threshold (e.g., is equal to, less than, and/or greater than a threshold value), as determined by the decision engine 107, the classification 105 and uncertainty score 106 may be input to a decision model 108. In some examples, the decision model 108 may include logic that determines to use the classification 105 output by the model 102. In other examples, the decision model 108 may include a separate model, including but not limited to a separate machine-learning model such as a deep learning model and/or any other model for dynamically determining an action 112 to be performed based on the inputs 105, 106.

It will be appreciated that an uncertainty score 106 may reflect uncertainty in a number of ways, such that a high uncertainty score 106 may indicate greater uncertainty or less uncertainty than a relatively lower uncertainty score 106. The uncertainty score may be within any defined range of values, such as 0-1, 1-100, and/or the like. If the uncertainty score fails to satisfy the threshold, the decision engine 107 may determine the action 112 to be performed based on rules data 110. For example, the rules data 110 may include merchant-specified rules, issuer-specified rules, transaction service provider-specified rules, and/or the like. The rules data 110 may include, for example, a predetermined action specified by a merchant and/or issuer for all uncertain results (e.g., an uncertainty score satisfying a threshold associated with a high degree of uncertainty).

In non-limiting embodiments, the deep learning classification model 102 may be trained to determine an uncertainty score for the classification (e.g., label) it outputs. This may be done through directly optimizing specific neurons of an ANN used in the deep learning classification model 102 during training. In some non-limiting embodiments, a Beta distribution algorithm may be utilized for training as described herein. In some non-limiting embodiments, a Gaussian logits algorithm may be utilized for training as described herein.

Figure 4:
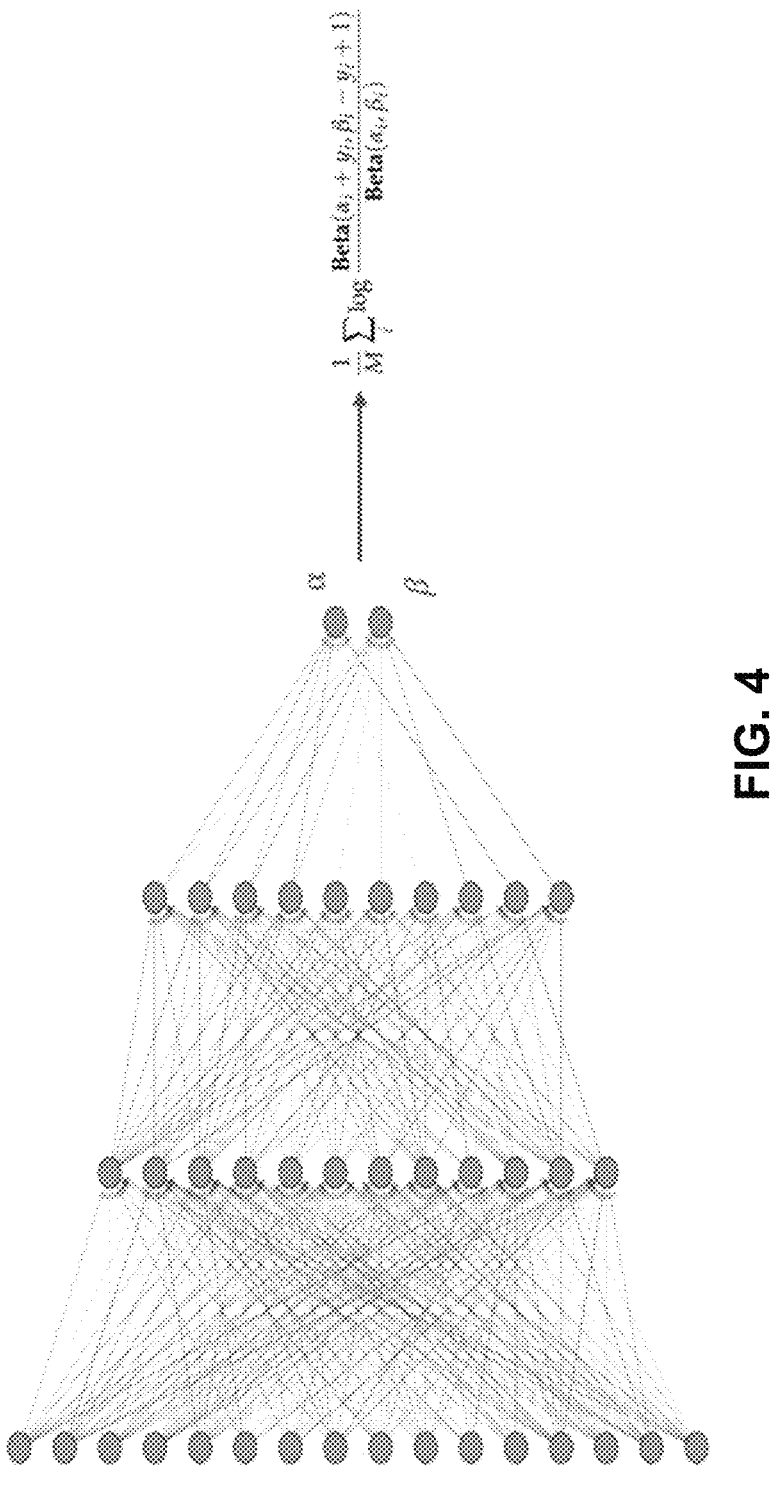
FIG. 4 is a diagram of a Beta distribution algorithm according to non-limiting embodiments.

FIG. 4 shows a diagram of a Beta distribution algorithm according to non-limiting embodiments. In non-limiting embodiments in which the Beta distribution algorithm is utilized, two neurons of the ANN for the deep learning classification model 102 may be trained to represent two parameters ($\alpha$, $\beta$) of the Beta distribution of probabilities that characterizes the predicted probability p, where p is treated as a random variable rather than a deterministic value. The probability is then used in a loss function for training. In this manner, deep learning is used to model the predicted probability as a random variable such that it has a distribution of probabilities, and the information represented by the distribution of probabilities may be used to construct the uncertainty score. This is illustrated with the following equation:

$$f(p; \alpha, \beta) = \frac{p^{\alpha-1}(1-p)^{\beta-1}}{\text{Beta }(\alpha, \beta)}$$

where $$\text{Beta }(\alpha, \beta) = \frac{\Gamma(\alpha)\Gamma(\beta)}{\Gamma(\alpha+\beta)}.$$

The predicted probability p is used to determine an uncertainty score (e.g., confidence interval) for a predicted classification. Thus, for each new input 101 to the model 102, the corresponding two parameters of the Beta distribution may be inferred, and the predicted probability and uncertainty score (e.g., confidence interval) may be determined based on these inferred parameters.

In non-limiting embodiments, the confidence interval is used to quantify the uncertainty score. For example, a predicted probability $p_i$ may be calculated as:

$$\hat{p}_i = \frac{\alpha_i}{\alpha_i + \beta_i}$$

where the variance is represented by:

$$\hat{v}_i(\alpha_i, \beta_i) = \frac{\alpha_i\beta_i}{(\alpha_i + \beta_i)^2(\alpha_i + \beta_i + 1)}.$$

The predicted classification (e.g., predicted label) is represented by:

$$\hat{y}_i = I(\hat{p}_i > 0.5)$$

In the above representation, 0.5 is a specified threshold (e.g., cutoff) such that, in an example where the confidence interval is [0.45, 0.55], the interval contains the value of 0.5 and indicates uncertainty, and in an example where the confidence interval is [0.7, 0.9], the interval does not contain the value of 0.5 and indicates certainty.

The predicted confidence interval for the classification output may then be determined with the following equation:

$$\hat{p}_i - q_{\frac{\alpha}{2}}\hat{v}_i, \hat{p}_i + q_{\frac{\alpha}{2}}\hat{v}_i$$

Figure 5:
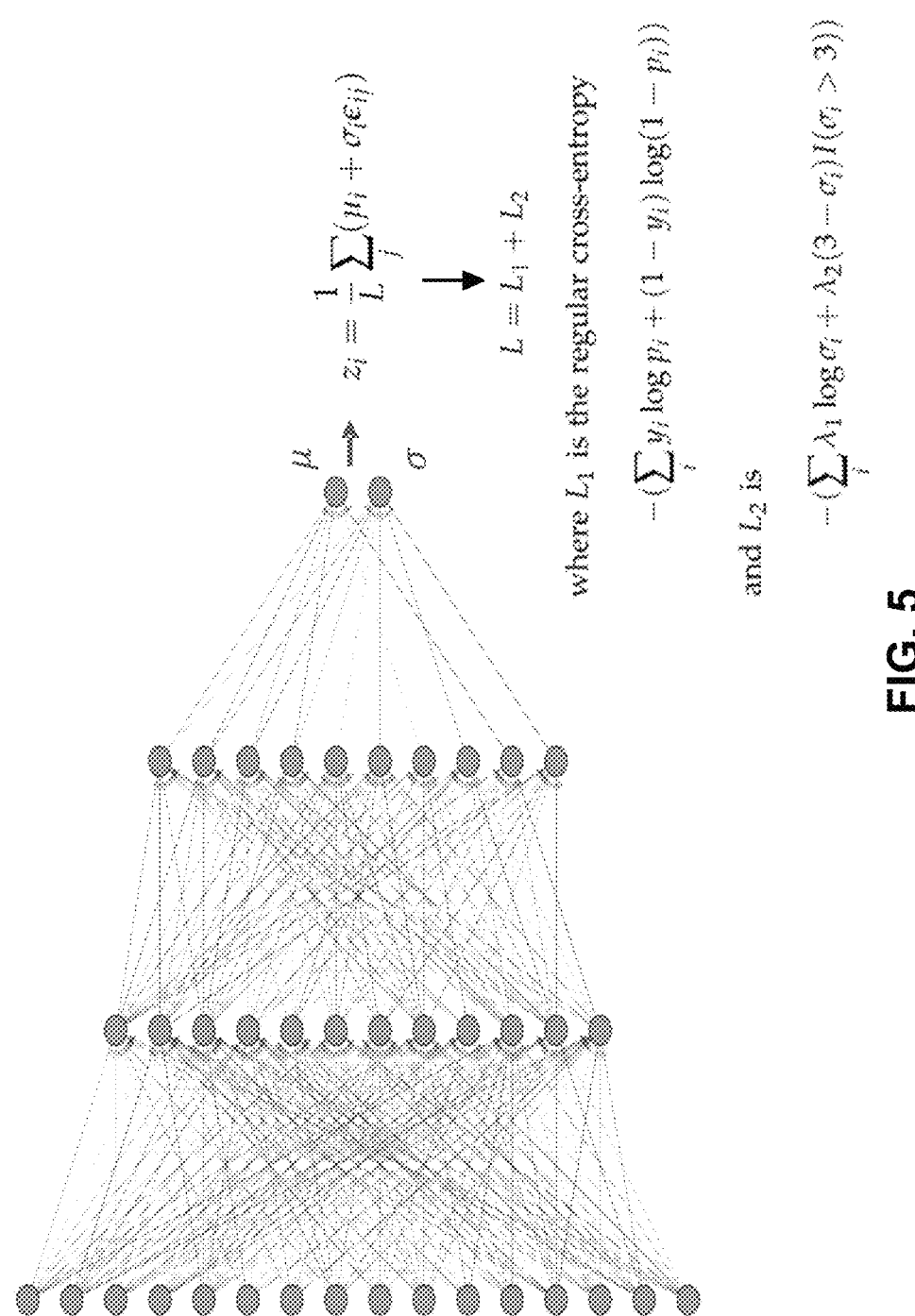
FIG. 5 is a diagram of a Gaussian logits algorithm according to non-limiting embodiments.

FIG. 5 shows a diagram of a Gaussian logits algorithm according to non-limiting embodiments. In non-limiting embodiments in which the Gaussian logits algorithm is used, rather than a Beta distribution algorithm, the uncertainty score may be determined by quantifying values for the neurons on the second-to-last layer (e.g., the logit layer prior to the predicted probability layer) of the ANN for the model 102. In such embodiments, the values may be quantified as a Gaussian (e.g., normal) distribution with two parameters $\mu$, $\sigma$. The model 102 may be trained to learn these two parameter values for each set of input training data. An uncertainty score (e.g., confidence interval) is first determined for the parameters of the logit layer. The uncertainty score for the predicted probability (e.g., the final score output of the model 102) may then be determined as a sigmoid activation function of the uncertainty score for the parameters of the logit layer. For example, the logit $z_i$ for each data element can be obtained by re-parametrization where $$z_i = \frac{1}{L}\sum_j u_i + \sigma_i\varepsilon_{ij},$$

where $\epsilon_{ij} \sim N(0, 1)$ and L represents a number of Monte Carlo samples. In non-limiting embodiments, for simplicity, the value L=1 may be used, although it will be appreciated that various values may be used.

In non-limiting embodiments, the confidence interval for the logit is represented as $$z_i \pm \frac{q_\alpha}{2}\sigma_i.$$

Thus, the confidence interval for the estimated probability is: $(z_i \pm q\alpha/2 * \sigma_i)$, where $\alpha$ is sigmoid activation function.

In non-limiting embodiments, the loss function used for training the model 102 has two parts $L=L_1+L_2$, where $L_1$ is regular cross entropy and $L_2$ may be represented by the following equation:

$$-\left(\sum_i \lambda_1 \log\sigma_i + \lambda_2(3 - \sigma_i)I(\sigma_i > 3)\right)$$

In non-limiting embodiments, the two-part loss function penalizes the terms of a close to zero (0) (e.g., lower than a threshold), which enforces the uncertainty into the network, and penalizes larger values of a (e.g., higher than a threshold) to reduce variabilities.

In non-limiting embodiments, the confidence interval is used to quantify the uncertainty. For example, a predicted probability $\hat{p}_i$ may be calculated as:

$$\hat{p}_i = \frac{\alpha_i}{\alpha_i + \beta_i}$$

where the variance is represented by:

$$\hat{v}_i(\alpha_i, \beta_i) = \frac{\alpha_i\beta_i}{(\alpha_i + \beta_i)^2(\alpha_i + \beta_i + 1)}.$$

The predicted classification (e.g., predicted label) is represented by:

$$\hat{y}_i = I(\hat{p}_i > t),$$

where t is a threshold (e.g., cutoff) for predicted probability.

The predicted two-sided confidence interval for the classification output may then be determined with the following equation:

$$\hat{p}_i(\alpha_i, \beta_i) \pm q_{1-\frac{A}{2}}\hat{v}_i(\alpha_i, \beta_i),$$

where $$q_{1-\frac{A}{2}}$$

is a value of $$\left(1 - \frac{A}{2}\right)$$

percentile of a standard normal distribution, and A is the confidence level (e.g., indicating the probability that a statistical estimate in the sample is also true for the population). In this example, the proposed uncertainty measure may be represented as:

$$|\widehat{p}_i - t|/\widehat{v}_i$$

Figure 2:
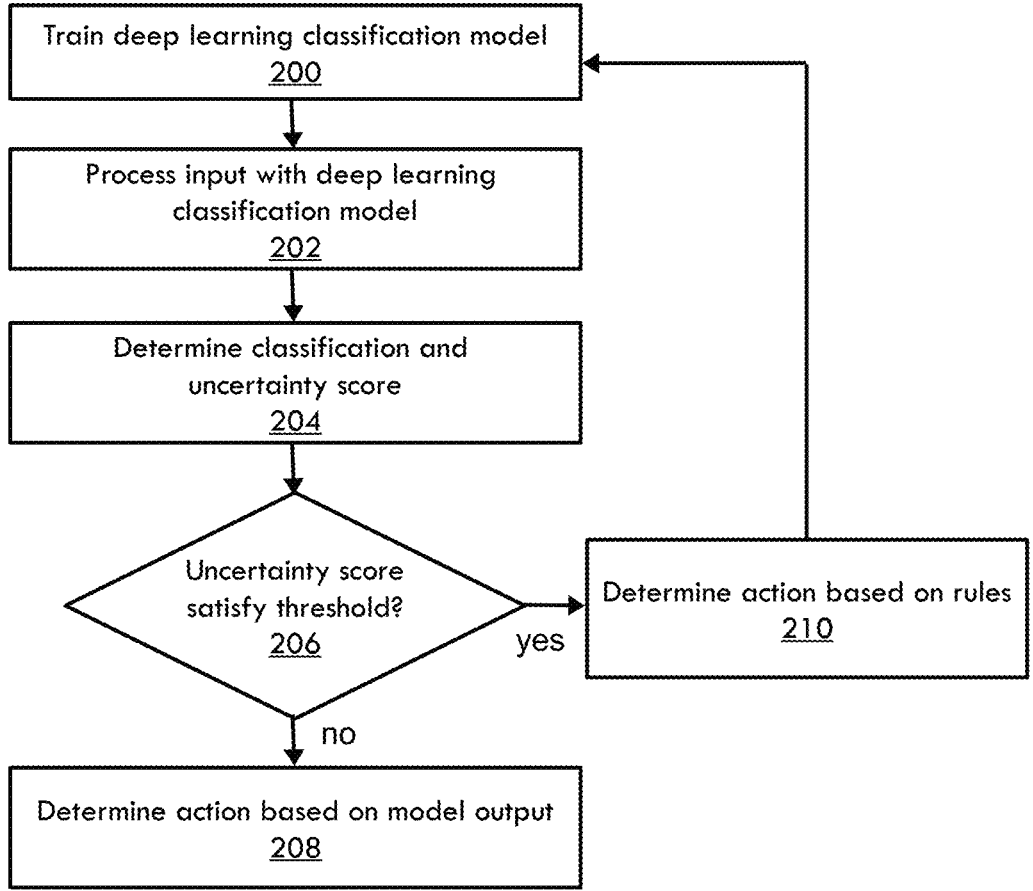
FIG. 2 is a flowchart of a method for determining uncertainty from a deep learning classification model according to non-limiting aspects or embodiments.

Referring now to FIG. 2, a flow diagram is shown for a method for determining uncertainty from a deep learning classification model. The steps in FIG. 2 are for exemplary purposes only and it will be appreciated that additional, fewer, and/or a different order of steps may be used in non-limiting embodiments. At step 200, a deep learning classification model is trained with labeled data. As explained herein, two or more parameters of two neurons of the ANN of the deep learning classification model are trained for quantifying classification uncertainty. In non-limiting embodiments in which a service is provided to a client computer for classifying data, the training data (e.g., features and corresponding labels) may be provided by the client computer prior to step 200 being executed.

With continued reference to FIG. 2, at step 202, an input may be processed with the deep learning classification model. As an example, a service may allow for a client computer to send a request (e.g., via an Application Programming Interface (API) or other like interface) with data to be classified to a server computer. The classification may seek to classify (e.g., label) data, such as classifying transaction data and/or user data as being approved or declined for a particular process. The deep learning classification model outputs a classification (e.g., label) for the inputted data and an associated uncertainty score at step 204.

At step 206, it is determined whether the uncertainty score satisfies a threshold (e.g., is equal to, less than, and/or greater than a threshold). As an example, if the uncertainty of the classification is greater or equal to a threshold (or if a corresponding confidence score is less than a threshold), the method may proceed to step 210 in which an action is determined based on one or more rules. For example, the rules may be preconfigured by an entity (e.g., an issuer or a merchant) to specify an automated action and/or decision logic to execute if the classification lacks confidence. The action may be based on a value (e.g., a transaction value), the degree of uncertainty, and/or any other preconfigured logic. In some examples, the method may proceed from step 210 back to step 200 and the model may be trained with the result of step 210. In some non-limiting embodiments, at step 206, if the uncertainty of the classification is greater or equal to a threshold (or if a corresponding confidence score is less than a threshold), the method may proceed to step 200 for re-training of the model without executing step 210.

If the classification is determined to be certain enough at step 206 (e.g., if the uncertainty is below a threshold, if a confidence score exceeds a threshold, and/or the like), the method proceeds to step 208 and an action may be determined based on a decision model. In non-limiting examples, the decision model may be an acceptance of the output of the deep learning classification model (e.g., the label output of the deep learning classification model may be maintained and correspond to an action).

Non-limiting embodiments of the system 1000 may be employed to process transaction data (e.g., individual transactions, groups of transactions, and/or the like) in an electronic payment processing network. For example, the deep learning classification model 102 may be used for stand-in processing (STIP) in which a transaction service provider or another entity processes and authorizes transactions in place of an issuer system that may be offline or temporarily unavailable. In such cases, STIP transactions may be classified and automatically authorized or rejected in accordance with a decision model 108 if the uncertainty score and/or confidence score for the classification satisfies a threshold. Likewise, STIP transactions that are classified with a confidence that does not satisfy the threshold may be subject to a rules-based decision (e.g., a predetermined decision from the issuer to authorize or reject based on a transaction amount or the like). In another example, the deep learning classification model 102 may be used for account verification in which merchants seek to verify that a particular account is in good standing. In such cases, account information (e.g., transaction history for the account) may be classified as verified or unverified and with an uncertainty score and/or confidence score. Accordingly, if the uncertainty score and/or confidence score satisfies a threshold, the account may be automatically verified. If the uncertainty score and/or confidence score does not satisfy the threshold, the decision may be subject to a rules-based decision (e.g., a predetermined decision from the merchant to verify an account based on specific parameters and/or thresholds).

In non-limiting embodiments, a "triple" Generational Adversarial Network (TripleGAN) is trained using the output of the system. For example, classified data (e.g., labeled data) may be input into a TripleGAN model for each data entry in which the uncertainty score and/or confidence score satisfies a threshold (e.g., confident data), and unclassified data (e.g., unlabeled data) may be input into the TripleGAN model for all other data entries (e.g., less confident data).

Figure 3:
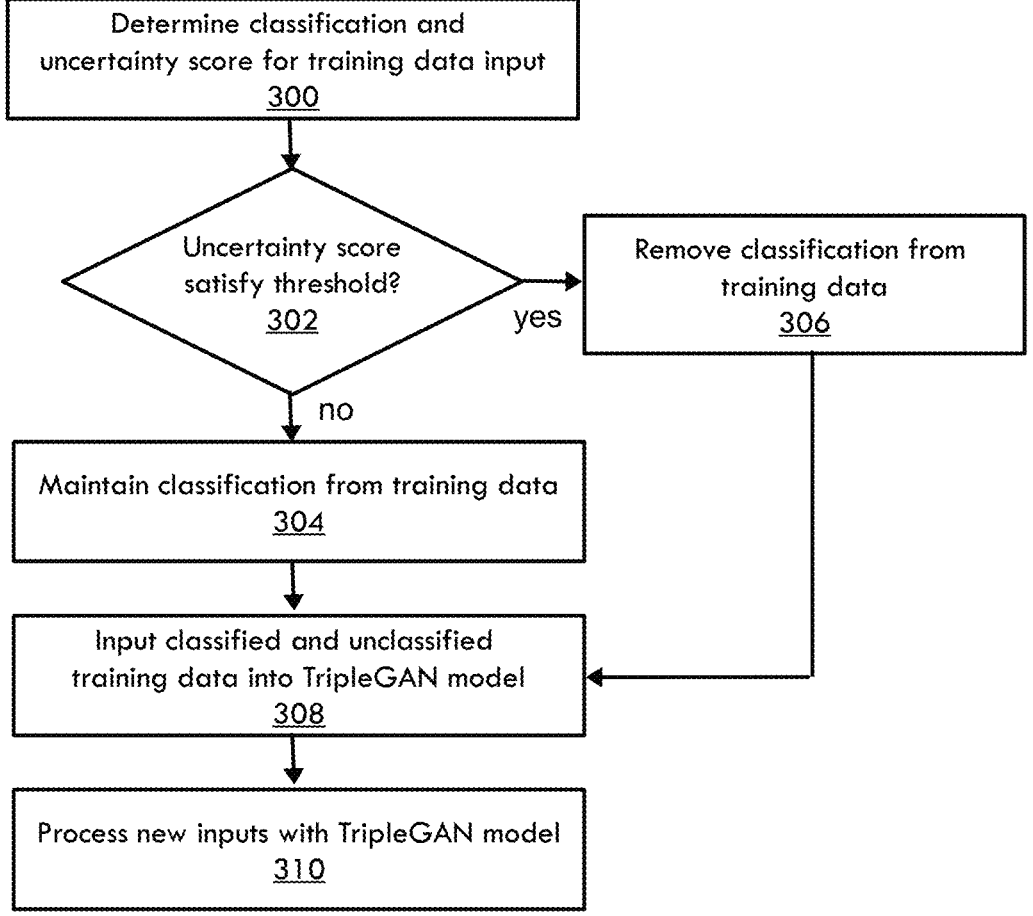
FIG. 3 is a flowchart of a method for determining uncertainty from a deep learning classification model according to non-limiting aspects or embodiments.

Referring now to FIG. 3, a flow diagram is shown for a method for training a TripleGAN model according to non-limiting embodiments. The steps in FIG. 3 are for exemplary purposes only and it will be appreciated that additional, fewer, and/or a different order of steps may be used in non-limiting embodiments. At step 300, training data input (e.g., labeled data) is provided to a deep learning classification model, which outputs a classification (e.g., label) and uncertainty score (or confidence score). At step 302, it is determined whether the uncertainty score satisfies a threshold (e.g., is equal to, less than, and/or greater than a threshold). As an example, if the uncertainty of the classification is greater or equal to a threshold (or if a corresponding confidence score is less than a threshold), the method may proceed to step 306 in which the classification (e.g., label) resulting from step 300 is removed (e.g., disregarded such that the input feature is not associated). Otherwise, the method proceeds to step 304 and the classification (e.g., label) resulting from step 300 is maintained (e.g., associated with the input feature).

With continued reference to FIG. 3, at step 308 the labeled model outputs (e.g., the result of step 304), the unlabeled model outputs (e.g., the result of step 306), and the original training data input are used to train a TripleGAN model. The TripleGAN model may include a generator that generates sample input data based on the original training data to input into a discriminator, along with labeled samples, to identify correct feature/label pairs. The TripleGAN includes a classifier (e.g., classification model) to help, along with the generator, to characterize the conditional distribution between feature (e.g., data) and classification (e.g., label). After the TripleGAN model is trained, new inputs (e.g., unlabeled features) may be input into the TripleGAN model at step 310 to be classified.

Figure 6:
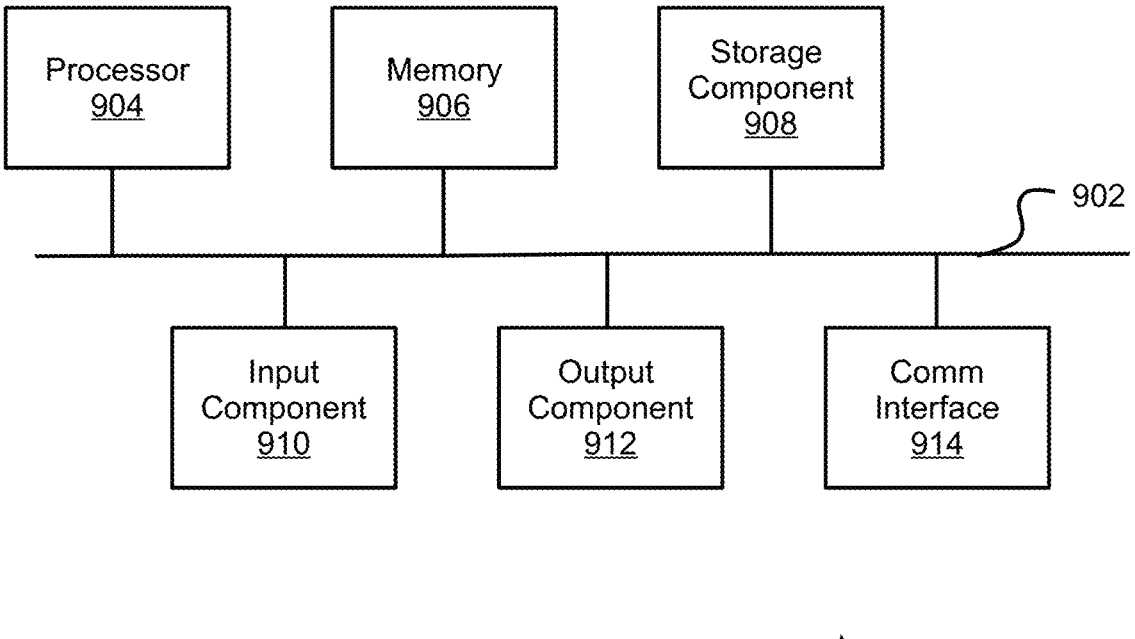
FIG. 6 is a diagram of components of one or more devices of FIG. 1 according to non-limiting aspects or embodiments.

Referring now to FIG. 6, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 6. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), virtual or augmented reality depicting systems and devices, etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 6, storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although examples have been described in detail for the purpose of illustration based on what is currently considered to be the most practical and preferred aspects or embodiments, it is to be understood that such detail is solely for that purpose and that the principles described by the present disclosure are not limited to the disclosed aspects or embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system comprising:
a transaction processing system arranged in an electronic payment processing network with at least one issuer system and a plurality of merchants, the transaction processing system comprising at least one processor programmed or configured to:
receive, through the electronic payment processing network, a stand-in processing request for a requested transaction from a merchant based on the issuer system being offline or unavailable to authorize the requested transaction;
determine a classification for an input based on a deep learning classification model, the input comprising transaction data for the requested transaction;
generate an uncertainty score for the classification based on an output of the deep learning classification model;
determine whether the uncertainty score satisfies a threshold;
in response to determining that the uncertainty score satisfies the threshold, determine an automated action based on a decision model, the automated action comprising authorizing or rejecting the stand-in processing request; and
in response to determining that the uncertainty score does not satisfy the threshold, determine the automated action based on at least one predefined rule from rules data independent of the deep learning classification model, the automated action comprising authorizing or rejecting the stand-in processing request.

2. The system of claim 1, wherein the uncertainty score comprises a confidence interval based on a predicted probability.

3. The system of claim 1, wherein the at least one processor is programmed or configured to generate the uncertainty score for the classification as an output of the deep learning classification model.

4. The system of claim 1, wherein the at least one processor is programmed or configured to:

determine two parameters of a Beta distribution of predicted probabilities based on the deep learning probability model, wherein generating the uncertainty score for the classification is based on the two parameters.

5. The system of claim 1, wherein the at least one processor is programmed or configured to:

determine two parameters of a logit layer of the deep learning probability model, wherein generating the uncertainty score for the classification is based on the two parameters.

6. The system of claim 1, wherein the input is received from a client computer in communication with the transaction processing system.

7. A method comprising:

receiving, by at least one processor of a transaction processing system arranged in an electronic payment processing network with at least one issuer system and a plurality of merchants, a stand-in processing request for a requested transaction from a merchant based on the issuer system being offline or unavailable to authorize the requested transaction;

determining, with at least one processor, a classification for an input based on a deep learning classification model, the input comprising transaction data for the requested transaction;

generating, with at least one processor, an uncertainty score for the classification based on an output of the deep learning classification model;

determining, with at least one processor, whether the uncertainty score satisfies a threshold; and in response to determining that the uncertainty score satisfies the threshold, determining, with at least one processor, an automated action based on a decision model from rules data independent of the deep learning classification model, the automated action comprising authorizing or rejecting the stand-in processing request.

8. The method of claim 7, further comprising:

in response to determining that the uncertainty score does not satisfy the threshold, determining the automated action based on at least one predefined rule.

9. The method of claim 7, further comprising:

generating the uncertainty score for the classification as an output of the deep learning classification model.

10. The method of claim 7, further comprising:

determining two parameters of a Beta distribution of predicted probabilities based on the deep learning probability model, wherein generating the uncertainty score for the classification is based on the two parameters.

11. The method of claim 7, further comprising:

determining two parameters of a logit layer of the deep learning probability model, wherein generating the uncertainty score for the classification is based on the two parameters.

12. A computer program product comprising at least one non-transitory computer-readable medium including program instructions that, when executed by at least one processor of a transaction processing system arranged in an electronic payment processing network with at least one issuer system and a plurality of merchants, cause the at least one processor to:

receive, through the electronic payment processing network, a stand-in processing request for a requested transaction from a merchant based on the issuer system being offline or unavailable to authorize the requested transaction;

determine a classification for an input based on a deep learning classification model, the input comprising transaction data for the requested transaction;

generate an uncertainty score for the classification based on an output of the deep learning classification model;

determine whether the uncertainty score satisfies a threshold;

in response to determining that the uncertainty score satisfies the threshold, determine an automated action based on a decision model, the automated action comprising authorizing or rejecting the stand-in processing request; and in response to determining that the uncertainty score does not satisfy the threshold, determine the automated action based on at least one predefined rule from rules data independent of the deep learning classification model, the automated action comprising authorizing or rejecting the stand-in processing request.

13. The computer program product of claim 12, wherein the uncertainty score comprises a confidence interval based on a predicted probability.

14. The computer program product of claim 12, wherein the program instructions further cause the at least one processor to:

generate the uncertainty score for the classification as an output of the deep learning classification model.

15. The computer program product of claim 12, wherein the program instructions further cause the at least one processor to:

determine two parameters of a Beta distribution of predicted probabilities based on the deep learning probability model, wherein generating the uncertainty score for the classification is based on the two parameters.

16. The computer program product of claim 12, wherein the program instructions further cause the at least one processor to:

determine two parameters of a logit layer of the deep learning probability model, wherein generating the uncertainty score for the classification is based on the two parameters.

17. The computer program product of claim 12, wherein the input comprises transaction data for a requested transaction.

18. The computer program product of claim 12, wherein the input is received from a client computer in communication with the transaction processing system.

* * * * *